United States Patent
Fava

(10) Patent No.: US 8,871,846 B2
(45) Date of Patent: Oct. 28, 2014

(54) OXYGEN SCAVENGING PLASTIC MATERIAL

(75) Inventor: Flavio Fava, Parabiago (IT)

(73) Assignee: Clariant Masterbatches (Italia) S.p.A., Pogliano Milanese (IT)

( * ) Notice: Subject to any disclaimer, the term of this patent is extended or adjusted under 35 U.S.C. 154(b) by 0 days.

(21) Appl. No.: 13/702,791

(22) PCT Filed: Jun. 16, 2011

(86) PCT No.: PCT/EP2011/002976
§ 371 (c)(1),
(2), (4) Date: Dec. 7, 2012

(87) PCT Pub. No.: WO2012/000614
PCT Pub. Date: Jan. 5, 2012

(65) Prior Publication Data
US 2013/0089686 A1    Apr. 11, 2013

(30) Foreign Application Priority Data
Jun. 30, 2010    (EP) .................................... 10006748

(51) Int. Cl.
*C08K 5/09*    (2006.01)

(52) U.S. Cl.
USPC ........... 524/306; 524/311; 524/312; 524/313; 524/314; 524/474; 524/487

(58) Field of Classification Search
USPC ......... 524/306, 311, 312, 313, 314, 385, 474, 524/487
See application file for complete search history.

(56) References Cited

U.S. PATENT DOCUMENTS

| | | | |
|---|---|---|---|
| 5,021,515 A | 6/1991 | Cochran et al. | |
| 5,211,875 A | 5/1993 | Speer et al. | |
| 5,310,497 A | 5/1994 | Ve Speer et al. | |
| 5,346,644 A | 9/1994 | Speer et al. | |
| 5,350,622 A | 9/1994 | Speer et al. | |
| 5,639,815 A | 6/1997 | Cochran et al. | |
| 5,700,554 A | 12/1997 | Speer et al. | |
| 5,811,027 A | 9/1998 | Speer et al. | |
| 5,955,527 A | 9/1999 | Cochran et al. | |
| 6,500,895 B1 | 12/2002 | Bastiaens et al. | |
| 6,777,479 B1 * | 8/2004 | Bernard et al. | ............... 524/445 |

FOREIGN PATENT DOCUMENTS

| | | |
|---|---|---|
| EP | 0507207 | 10/1992 |
| EP | 1655238 | 5/2006 |
| WO | WO 99/15433 | 4/1999 |
| WO | WO 01/10945 | 2/2001 |
| WO | WO 01/10947 | 2/2001 |
| WO | WO 02/33024 | 4/2002 |
| WO | WO 2005/023530 | 3/2005 |
| WO | WO 2006/063032 | 6/2006 |
| WO | WO 2009/029479 | 3/2009 |

OTHER PUBLICATIONS

PCT International Search Report for PCT/EP2011/002976, mailed Nov. 11, 2011.
PCT International Preliminary Report on Patentability for PCT/EP2011/002976, mailed Jan. 8, 2013.

* cited by examiner

*Primary Examiner* — Edward Cain
(74) *Attorney, Agent, or Firm* — Anthony A. Bisulca

(57) ABSTRACT

The invention relates to a plastic material comprising a composition Z comprising the components A, B, C and D, the component A being a polyester, the component B being a polyamide, the component C being a transition metal catalyst, the component D being an organic compound selected from the group consisting of paraffins, vegetable oils, polyalkylene glycols, esters of polyols, alkoxylates, and mixtures of these substances.

16 Claims, 1 Drawing Sheet

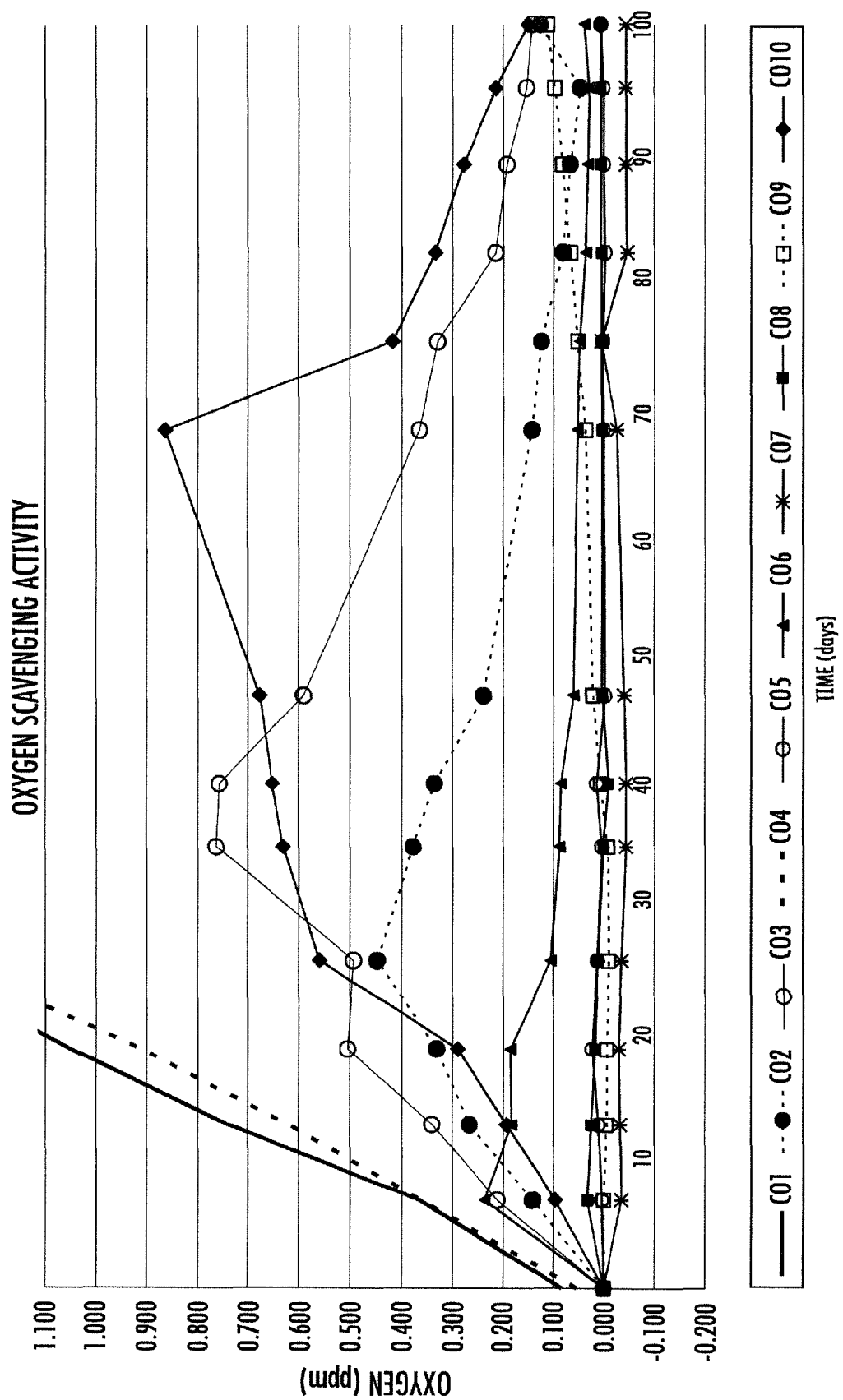

OXYGEN SCAVENGING PLASTIC MATERIAL

The present invention relates to methods of initiating oxygen scavenging by providing a polyester composition comprising an organic compound, which is preferably liquid at ambient temperature, a transition metal catalysts and a polyamide, to enhance the quality and shelf-life of oxygen-sensitive products. More particularly, the present invention relates to plastic material and articles comprising polyester and polyamide having excellent gas barrier properties and short or negligible oxygen scavenging induction periods.

For the purposes of the invention, masterbatches (MB) are compositions comprising a polymeric carrier or a liquid vehicle and an additive, where the additive is present in the masterbatch in higher concentrations than in the final application or in the final article, and the carrier does not have to be the organic polymer of the final application or of the final article. Preferred concentrations of the additives in a masterbatch range preferably of from 0.5 to 90% by weight, more preferably of from 1 to 80% by weight, the % by weight based in each case on the total weight of the masterbatch.

For the purposes of the invention, compounds (CO) are compositions comprising an organic polymer and an additive, where the additive is present in the compound in the desired concentration for the final application or for the final article, and the organic polymer is the organic polymer of the final application or of the final article, so that the compound is merely brought to the desired shape of the final application or of the final article by means of a physical shaping process.

Packaging for personal care, medical, pharmaceutical, household, industrial, food and beverage products require high barrier properties to oxygen and carbon dioxide to preserve the freshness of the package contents. Containers made exclusively of glass or metal provide an excellent barrier both to egress of substances from the container and to ingress of substances from the environment. In most instances, gas permeation through a glass or metal container is negligible. Containers made of polymers, in whole or in parts, generally do not possess the shelf life or barrier properties of glass or metal containers. A number of solutions to overcome problems associated with plastic containers have been proposed. One material commonly used in packaging applications is polyethylene terephthalate resin, hereafter referred to as PET. PET has a number of advantageous properties for use in packaging applications, but it does not possess the gas barrier properties that are required or desired in many applications. For example, although PET has good oxygen barrier properties for carbonated soft drinks, it has not been useful as a package material for other products, such as beer which rapidly loses flavour due to oxygen migration into the bottle.

Blends containing small amounts of high barrier polyamides, such as poly(m-xylylene adipamide), typically known commercially as MXD6, with polyesters such as PET, enhance the passive barrier properties of PET. To further reduce the entry of oxygen into the contents of the package, small amounts of transition metal salts can be added to the blend of PET and polyamide to catalyze and actively promote the oxidation of the polyamide polymer, thereby further enhancing the oxygen barrier characteristics of the package.

The active oxygen scavenging of many blends of oxygen scavenging transition metals and polyamides with PET does not begin immediately to a significant extent. The "induction period", which is the time that elapses from the formation of the article and its filling until the time a useful oxygen scavenging activity commences leading to a significant reduction of the oxygen transmission rate, of many polyamide/cobalt salt blends in PET extends well into the life cycle of a filled package so as to make these blends practically useless as active oxygen scavengers. In some cases, the induction period is so long that no significant oxygen scavenging takes place before the contents of the package are consumed, such that it no longer makes practical sense to refer to an induction period.

U.S. Pat. No. 5,021,515A, U.S. Pat. No. 5,639,815A and U.S. Pat. No. 5,955,527A by Cochran et al. disclose the use of a cobalt salt as the preferred transition metal catalyst and MXD6 as the preferred polyamide. It is mentioned that the scavenging properties of the compositions do not emerge immediately after the blending, but only after ageing.

This delay, referred to as the induction period, may reach 30 days and can be counteracted by costly aging techniques (prolonged ageing at ordinary temperatures or ageing accelerated by elevated temperatures) or by higher levels of oxidation catalyst.

Much work has been done to improve oxygen barrier properties of oxygen scavenging compositions and minimize corresponding induction periods.

Improved oxygen scavenging compositions, based on transition metal/polyamide blends in PET, have been disclosed in U.S. Pat. No. 5,302,430A and in EP 0527903B1. In the first document, long induction periods characteristic of composition comprising MXD6 and cobalt salts are ascribed to the presence of phosphorous compounds that are incorporated during the polyamide polymerisation and/or added during the stabilization phase. In the second disclosure, it is believed that the improvement of the oxygen barrier properties is due to the activated groups in the "partially split or degraded" polyamide used, which are more sensitive to reaction with oxygen in the presence of metal ions compared to non-activated polyamides.

Another approach to scavenging oxygen is using oxygen-scavenging compositions comprising an oxidizable ethylenically unsaturated hydrocarbon and a transition metal catalyst. U.S. Pat. No. 5,310,497A, U.S. Pat. No. 5,211,875A, U.S. Pat. No. 5,346,644A and U.S. Pat. No. 5,350,622A disclose the use of poly(1,2-butadienes) as the ethylenically unsaturated hydrocarbons; U.S. Pat. No. 5,021,515A and U.S. Pat. No. 5,211,875A disclose the use of an oxidizable polymer such as polyamide, polyisoprene, polybutadiene, or copolymers thereof, specifically block copolymers thereof, such as styrene-butadiene.

It is known that oxygen scavenging compositions comprising unsaturated polymers and a transition metal catalyst can be triggered or activated by heat after forming a packaging article from the composition. Such compositions and methods are disclosed in WO 02/33024 A2. In these cases, the composition or article is immediately active and is expected to benefit from the storage methods described.

U.S. Pat. No. 5,211,875A and U.S. Pat. No. 5,811,027A disclose methods for minimizing the induction period of oxygen scavenging compositions by initiating oxygen scavenging via exposure to radiation. Both teach methods that rely on radiation comprising UV or visible light, with wavelengths comprising UV radiation being preferred, and in the presence of a photoinitiator to further facilitate or control the initiation of the oxygen scavenging properties. Such UV initiation systems are especially useful for oxygen scavenging compositions comprising non-aromatic polymers.

Although UV triggering permits control of when oxygen scavenging is initiated, the use of such methods relying on UV radiation for induction of oxygen scavenging has limitations. First, oxygen-scavenging compositions can comprise materials that are opaque to UV radiation, thus limiting the ability of the UV radiation to activate oxygen scavenging. For example, oxygen scavenging compositions that comprise polymers like polyethylene terephthalate (PET) or polyethylene naphthalate (PEN) are difficult to trigger using UV initiation methods because these polymers absorb UV light. Furthermore, due to the geometric and physical constraints associated with UV radiation, it can be difficult to achieve uniform UV treatment of preformed, angular oxygen scavenging packaging articles.

A need exists for the ready initiation of oxygen scavenging in oxygen scavenging compositions that is efficient regardless of whether UV opaque materials are present in the composition. It is also desirable to have methods of initiating oxygen scavenging that are effective with oxygen scavenging compositions that comprise aromatic polymers. Improved methods for uniform initiation of oxygen scavenging in angular packaging articles would be useful. Furthermore, it would be beneficial to have oxygen scavenging compositions and packaging articles that do not require triggering, e.g. by photoinitiators or heat treatment, for efficient initiation of oxygen scavenging.

Surprisingly, the use of an inert organic compound, which preferably is liquid at ambient temperature, in transition metal-based polyester/polyamide compositions for the forming of articles, e.g. packaging materials for personal care, medical, pharmaceutical, household, industrial, food and beverage plastic products, shows a considerable improvement of the oxygen scavenging performance and a considerable reduction or a complete elimination of the oxygen scavenging induction period compared with known transition metal-based polyester/polyamide blends not comprising an inert liquid organic compound. Inert organic compounds are meant not to react with components A to E under manufacturing conditions as hereinafter described.

Subject of the invention is a plastic material comprising a composition Z comprising the components A, B, C and D, the component A being a polyester,
the component B being a polyamide,
the component C being a transition metal catalyst,
the component D being an organic compound selected from the group consisting of paraffins, vegetable oils, polyalkylene glycols, esters of polyols, alkoxylates, and mixtures of these substances.

Preferably, component A is selected from the group consisting of polyesters resulting from the condensation reaction of dibasic acids and glycols. Typically, the dibasic acid comprises an aromatic dibasic acid, or ester or anhydride thereof, and is selected from the group consisting of isophthalic acid, terephthalic acid, naphthalene-1,4-dicarboxylic acid, naphthalene-2,6-dicarboxylic acid, phthalic acid, phthalic anhydride, tetrahydrophthalic anhydride, trimellitic anhydride, diphenoxyethane-4,4'-dicarboxylic acid, diphenyl-4,4'-dicarboxylic acid, and mixtures thereof. The dibasic acid also can be an aliphatic dibasic acid or anhydride, such as adipic acid, sebacic acid, decan-1,10-dicarboxylic acid, fumaric acid, succinic anhydride, succinic acid, cyclohexanediacetic acid, glutaric acid, azeleic acid, and mixtures thereof. Other aromatic and aliphatic dibasic acids known to persons skilled in the art also can be used. More preferably, the dibasic acid comprises an aromatic dibasic acid, optionally further comprising up to about 20% by weight of the dibasic acid component, of an aliphatic dibasic acid.

BRIEF DESCRIPTION OF THE DRAWING

FIG. 1 is a graph of oxygen scavenging activity.

Preferably, the glycol or diol component of the polyester is selected from the group consisting of ethylene glycol, propylene glycol, butane-1,4-diol, diethylene glycol, a polyethylene glycol, a polypropylene glycol, neopentyl glycol, a polytetramethylene glycol, 1,6-hexylene glycol, pentane-1,5-diol, 3-methylpentanediol-(2,4), 2-methylpentanediol-(1,4), 2,2,4-trimethylpentane-diol-(1,3), 2-ethylhexanediol-(1,3), 2,2-diethylpropanediol-(1,3), hexanediol-(1,3), 1,4-di-(hydroxy-ethoxy)benzene, 2,2-bis-(4-hydroxycyclohexyl) propane, 2,4-dihydroxy-1,1,3,3-tetramethylcyclobutane, 2,2-bis-(3-hydroxyethoxyphenyl)propane, 2,2-bis-(4-hydroxypropoxyphenyl)propane, 1,4-dihydroxymethyl-cyclohexane, and mixtures thereof. Additional glycols known to persons skilled in the art also can be used as the glycol component of the polyester.

Two preferred polyesters are polyethylene terephthalate (PET) and polyethylene naphthalate (PEN). The PET and PEN can be homopolymers, or copolymers further containing up to 10 mole percent of a dibasic acid different from terephthalic acid or a naphthalene dicarboxylic acid, and/or up to 10 mole percent of a glycol different from ethylene glycol.

PEN is preferably selected from the group consisting of polyethylene naphthalene 2,6-dicarboxylate, polyethylene naphthalene 1,4-dicarboxylate, polyethylene naphthalene 1,6-dicarboxylate, polyethylene naphthalene 1,8-dicarboxylate, and polyethylene naphthalene 2,3-dicarboxylate. More preferably, PEN is polyethylene naphthalene 2,3-dicarboxylate.

More preferably component A is selected from the group consisting of PET, e.g. virgin bottle grade PET and postconsumer PET (PC-PET), cyclohexane dimethanol/PET copolymer (PETG), polyethylene naphthalate (PEN), polybutylene terephthalate (PBT), and mixtures thereof.

The polyester of component A preferably has an intrinsic viscosity of from 0.4 dl/g to 2.0 dl/g, more preferably of from 0.5 to 1.5 dl/g, even more preferably of from 0.7 to 1.0 dl/g. The determination of the intrinsic viscosity is carried out with a Davenport Melt Viscosimeter with the following conditions: predrying of 3.8 g polyester powder at 150° C. with vacuum for 8 to 12 h, Die length 1.269 cm, Die diameter 0.0508 cm, processing temperature 295° C.

Preferably, component B is selected from the group consisting of aliphatic polyamides and partially aromatic polyamides. The number average molecular weight $M_n$ of the polyamide is preferably from 1000 to 45000, more preferably between 3000 and 25000.

The aliphatic polyamides can be fully aliphatic polyamides and include a moiety—$CO(CH2)_nCONH(CH2)_mNH$— or a moiety—$(CH2)_pCONH$—, wherein n, m and p are integers independently from each other in the range of 1 to 10, preferably of 4 to 6. Preferably, aliphatic polyamides include poly(hexamethylene adipamide), poly(caprolactam) and poly(hexamethylene adipamide)-co-caprolactam.

Especially, the aliphatic polyamide is poly(hexamethylene adipamide)-co-caprolactam.

"Partially aromatic polyamide" within the meaning of the invention are polymerized from a mixture of aromatic and non-aromatic monomers or precursors.

Preferably, the partially aromatic polyamides are selected from the group consisting of polyamides formed from isophthalic acid, terephthalic acid, cyclohexanedicarboxylic acid, aliphatic diacids with 6 to 12 carbon atoms together with meta- or para-xylene diamine, 1,3- or 1,4-cyclohexane(bis) methylamine, aliphatic diamines with 4 to 12 carbon atoms, or aliphatic amino acids with 6 to 12 carbon atoms, or from lactams with 6 to 12 carbon atoms, in all possible combinations, and from other generally known polyamide forming diacids and diamines.

The partially aromatic polyamides may also contain small amounts of trifunctional or tetrafunctional comonomers such as trimellitic anhydride, pyromellitic dianhydride, or other polyamide forming polyacids and polyamines known in the art.

More preferably, partially aromatic polyamides are selected from the group consisting of poly(m-xylylene adipamide), poly(hexamethylene isophthalamide), poly(hexamethylene adipamide-co-isophthalamide), poly(hexamethylene adipamide-co-terephthalamide) and poly(hexamethylene isophthalamide-co-terephthalamide).

Even more preferably, the polyamide is poly(m-xylylene adipamide).

Preferably, component C is a transition metal catalyst active for oxidizing an oxidizable component, such as a polyamide, and accelerate the rate of oxygen scavenging. The mechanism by which this transition metal functions to activate or promote the oxidation of the polyamide polymer is not certain. The catalyst may or may not be consumed in the oxidation reaction, or if consumed, may only be consumed temporarily by converting back to a catalytically active state. As noted in U.S. Pat. No. 5,955,527A, a certain amount of the catalyst may be lost in side reactions, or the catalyst may be viewed as an initiator generating free radicals, which through branching chain reactions lead to the scavenging of oxygen out of proportion to the quantity of catalyst.

More preferably, the catalyst C is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced does not need necessarily to be that of the active form. The metal is preferably iron, nickel, manganese, cobalt or copper; more preferably manganese or cobalt; and even more preferably cobalt. Suitable counterions for the metal include, but are not limited to, chloride, acetate, propionate, oleate, stearate, palmitate, 2-ethylhexanoate, neodecanoate or naphthenate.

The metal salt can also be an ionomer, in which case a polymeric counterion is employed. Such ionomers are well known in the art.

Even more preferably, the salt, the transition metal, and the counterion are either compliant with country regulations in the matter of food contact materials or, if part of a packaging article, exhibit substantially no migration from the oxygen scavenging composition to the packaged contents. Particularly preferable salts include cobalt oleate, cobalt propionate, cobalt stearate, and cobalt neodecanoate.

Preferably component D is liquid at ambient temperature, i.e. 20 to 30° C., and atmospheric pressure. "Liquid" shall mean a dynamic viscosity of between 0.2 to 104 mPas, preferably 1 to 5000 mPas at 20° C., measured with a rotation viscosimeter.

Paraffins or mineral oils are preferably liquid $C_{5-19}$ hydrocarbons.

Vegetable oils are preferably selected from the group consisting of castor oils, soybean oils, linseed oils and rape seed oils.

Polyalkylene glycols include polymers of alkylene oxides. The polyalkylene glycol can be in the form of a homopolymer, or mixtures or combinations of homopolymers, or can include copolymers, such as block or random copolymers, or mixtures of combinations of such copolymers, or can include mixtures or combinations of homopolymers and copolymers. Preferably, polyalkylene glycols are selected from the group consisting of polyethylene glycol, polypropylene glycol and ethylene/propylene glycol copolymer, and have molecular weight from 200 to 600 g/mol.

Esters of polyols include glycol esters, polyalkylene glycol esters, glycerol esters, polyglycerol esters, sorbitan esters, sucrose esters and polyoxyalkylene polyol esters. Preferably, polyol esters are selected from the group consisting of polyalkylene glycol esters, glycerol esters, sorbitan esters.

Preferably, polyalkylene glycol esters are selected from the group consisting of polyethylene glycol esters, polypropylene glycol esters or esters of ethylene/propylene glycol copolymer. More preferably, polyalkylene glycol esters are selected from the group consisting of polyethylene glycol esters, more preferably from the group consisting of polyethylene glycol monolaurate and dilaurate, and polyethylene glycol monooleate and dioleate with the polyethylene glycol moiety (PEG) having an average molecular weight not higher than 600 g/mol.

Glycerol esters are preferably fatty acid esters of glycerol. Fatty acid esters of glycerol are preferably selected from the group consisting of monoacylglycerols, diacylglycerols, and triacylglycerols obtained by esterification of glycerol with one, two or three saturated or unsaturated fatty acids. More preferably, monoacylglycerols are esterified with acetic, lactic, succinic and citric acids. Sorbitan esters are preferably fatty acid esters of sorbitol. Fatty acid esters of sorbitol are preferably selected from the group consisting of monoacyl sorbitols, diacyl sorbitols, and triacyl sorbitols obtained by esterification of sorbitol with one, two or three saturated or unsaturated fatty acids. More preferably, fatty acid esters of sorbitol are selected from the group consisting of sorbitan monolaurate, sorbitan monooleate and sorbitan trioleate.

Alkoxylates are obtained by addition of alkylene oxide to a substrate such as linear or branched, primary or secondary $C_{12}$-$C_{18}$ alcohols, i.e. natural or synthetic fatty alcohols, alkylphenols, fatty acids, fatty acid ethanolamides, fatty amines, fatty acid esters and vegetable oils. The degree of alkoxylation, i.e. the molar ratio of alkylene oxide added per mole of substrate, varies within wide ranges, in general between 3 and 40, and is chosen according to the intended use. Preferably, the alkylene oxide is ethylene oxide. More preferably, the ethoxylates are selected from the group consisting of ethoxylated vegetable oils, ethoxylated esters of vegetable oils, and ethoxylated sorbitan esters. Even more preferably, the ethoxylates are selected from the group consisting of ethoxylated castor oil, ethoxylated sorbitan oleate and ethoxylated sorbitan laureate characterised by a total number of oxyethylene—$(CH_2CH_2O)$— groups in each molecule of from 4 to 20.

Optionally, composition Z comprises one or more further substances (component E), which is selected from the group consisting of natural colorants derived from plants or animals and synthetic colorants, preferred synthetic colorants being synthetic organic and inorganic dyes and pigments,
    preferred synthetic organic pigments being azo or disazo pigments, laked azo or disazo pigments or polycyclic pigments, particularly preferably phthalocyanine, diketopyrrolopyrrole, quinacridone, perylene, dioxazine, anthraquinone, thioindigo, diaryl or quinophthalone pigments;
    preferred synthetic inorganic pigments being metal oxides, mixed oxides, aluminium sulphates, chromates, metal powders, pearlescent pigments (mica), luminescent colours, titanium oxides, cadmium lead pigments, iron oxides, carbon black, silicates, nickel titanates, cobalt pigments or chromium oxides;

fillers and nanosized fillers, preferably silica, zeolites, silicates, particularly preferably aluminium silicates, sodium silicate, calcium silicates; chalk or talc; metal hydrates;

auxiliaries, preferably acid scavengers, processing aids, coupling agents, lubricants, stearates, blowing agents, polyhydric alcohols, nucleating agents, or antioxidants, e.g. stearates, or oxides such as magnesium oxide;

antioxidants, preferably primary or secondary antioxidants;

antistatic agents;

compatibilizers for polyester/polyamide blends;

UV absorbers, slip agents, anti-fogging agents, anti-condensation agents, suspension stabilizers, anti-blocking agents, waxes, and a mixture of these substances.

More preferably, component E is selected from the group consisting of compatibilizers for polyester-polyamide blends, antioxidants and colorants.

Good refractive index match between PET and poly(m-xylylene adipamide) (MXD6) results in blends that are almost as transparent as PET. However, haziness has been observed in biaxially oriented films and in stretched blown bottles. Incompatibility of PET and MXD6 results in large MXD6 particles that can effectively scatter light. Compatibilization of polyester/polyamide blends with compatibilizer E reduces particle size to the submicron level thus resulting in containers with greatly improved impact delamination resistance, adhesion, colour, and clarity.

Preferred compatibilizers include, but are not limited to, polyester ionomers, preferably PET ionomers, isophthalic acid (IPA) modified PET, p-toluene sulfonic acid (pTSA) modified PET, pyrometillic dianhydride (PMDA) modified PET, and maleic anhydride modified PET. Other preferred compatibilizers include acrylic modified polyolefin type ionomer and low molecular weight bisphenol-A epoxy resin-E44 which may be added directly to a PET/polyamide blend. Further, trimellitic anhydride (TMA) may be added to the polyamide, transesterified, mixed with PET and then coupled using a bifunctional coupler such as, but not limited to, diphenylmethane-4,4-diisocyanate (MDI), diphenylmethane-4,4-diisopropylurethane (DU), or bisoxazoline (BOX). When compatibilizers are used, preferably one or more properties of the polyamide/polyester blends are improved, such properties including color, haze, and adhesion between a layer comprising a blend and a layer comprising polyester.

Preferred polyester ionomers include those disclosed in U.S. Pat. No. 6,500,895 B1. Preferred PET ionomers include sulfonated PET. A preferred modified PET-type compatibilizer is IPA modified PET.

Preferably, the composition Z contains
of from 80 to 98.9% by weight of component A;
of from 1 to 10% by weight of component B;
of from 0.0001 to 0.8% by weight of component C;
of from 0.01 to 2% by weight of component D;
of from 0 to 18.9899%, preferably of from 0 to 18%, by weight of component E;

more preferably
of from 90 to 98% by weight of component A;
of from 1 to 7% by weight of component B;
of from 0.001 to 0.5% by weight of component C;
of from 0.1 to 2% by weight of component D;
of from 0 to 8.899% by weight of component E;

with the % by weight being based in each case on the total weight of the composition Z; and with the weight percent of the components A, B, C, D and E always adding up to 100%.

If component E is present, its lower limit is expediently 0.001%, preferably 0.01% by weight based on the total weight of the composition Z.

The plastic material of the present invention is expediently formed, e.g. blow molded, into a plastic article.

Therefore, another subject of the present invention is a formed plastic article comprising said plastic material.

Still another subject of the invention is a formed plastic article made of a plastic material consisting of composition Z.

The formed article according to the invention can be a packaging material, preferably a container, a film or a sheet, especially for use in packaging of personal care, cosmetics, medical, pharmaceutical, household, industrial, food and beverage products where a high oxygen barrier is needed.

Packaging materials suitable for comprising oxygen scavenging composition Z can be flexible, rigid, semi-rigid or some combination thereof.

Rigid packaging articles typically have wall thicknesses in the range of 100 to 1000 micrometers. Typical flexible packages typically have thicknesses of 5 to 250 micrometers.

Preferably, the containers, e.g. bottles, films and sheets in which composition Z is used to scavenge oxygen, are monolayer.

Packaging articles or films comprising oxygen scavenging compositions of the invention can consist of a single layer or may comprise multiple layers.

When a packaging article or film comprises an oxygen scavenging layer, it can further comprise one or more additional layers, one or more of the additional layers comprising an oxygen barrier layer or being permeable to oxygen. Further additional layers, such as adhesive layers, can also be used in a multi-layer packaging article or film.

Another subject of the invention is a method for the manufacture of a plastic material or an article as defined above, characterised in that the components A, B, C, D and optionally E, are physically mixed with one another and subjected to a shape forming process.

For physical mixing, it is possible to use a mixing apparatus customary in the plastics industry. Preferably, the mixing apparatus can be one used to make a liquid masterbatch or a solid masterbatch or can be a combination of those apparatuses.

A mixing apparatus for a liquid masterbatch can be a high speed dispersor (e.g. of Cowles™ type), a media mill, a three-roll mill, a submill or a rotor-stator type dispersor.

A mixing apparatus used to make solid masterbatches MB or compounds CO can be a mixer, extruder, kneader, press, mill, calender, blender, injection moulding machine, injection and stretch blow moulding machine (ISBM), extrusion blow moulding machine (EBM), compression moulding machine, compression and stretch blow moulding machine; more preferably a mixer, extruder, injection moulding machine, injection and stretch blow moulding machine, compression moulding machine, compression and stretch blow moulding machine; even more preferably a mixer, extruder, injection and stretch blow moulding machine and extrusion blow moulding machine.

The shape forming process for the article is dependent on the desired shape of article to be manufactured.

Containers are preferably made by blow moulding, injection moulding, injection and stretch blow moulding, extrusion blow moulding, compression moulding, compression and stretch blow moulding processes.

Films and sheets are preferably made by cast or blown film extrusion or co-extrusion processes, depending on the thickness required and on the number of layers needed to obtain specific properties, eventually followed by post-extrusion shaping processes like thermoforming or stretching. In the thermoforming process, the plastic sheet is heated to a pliable forming temperature, formed to a specific shape in a mold, and trimmed to create a final article. If vacuum is used, this process is generally called vacuum forming. In post-extrusion stretching processes an extruded film can be, for example, biaxially oriented by drawing. All the above listed processes are well-known in the art.

For compositions Z comprising more than one masterbatch or components, extruders may be equipped with a metering system for introducing said components and/or masterbatches into the main stream polymer. This metering may be carried out directly with one or more pure components or with one or more masterbatches.

The type of metering equipment used depends on the form in which the pure component or the masterbatch is metered.

In the case of solid component, a metering device of the feed screw type is usually employed and the point of introduction may be the main inlet of the extruder jointly with the feed of the main polymer granules, or in an unpressurized injection zone located along the extruder. For a solid masterbatches, the metering device may be a system comprising an additional extruder that pre-melts the masterbatch, pressurizes it and meters it by means of a metering pump, the amount of masterbatch metered being fed at a point along the main extruder advantageously without pressure.

For a liquid pure component or a liquid masterbatch, the metering device may be a system comprising one or more metering pumps which introduce the liquid masterbatch at the main inlet of the extruder jointly with the feed with the main polymer granules, without any pressure, or at a point under pressure located along the extruder.

The polyester/polyamide blends used in the present invention involve preparing the polyester and polyamide by known processes. The polyester and polyamide are separately or in combination dried in an atmosphere of dried air or dried nitrogen, or under reduced pressure.

Instead of melt compounding, the polyester and polyamide may be dry-blended and heat-molded or draw-formed into plastic articles.

Alternatively, the polyamide polymer can be added to the melt phase polymerization for making the polyester, preferably in the late stages of polyester manufacture. In the interest of avoiding or limiting the number of reactions which contribute to the formation of undesired colour or which may result in the degradation of the polyamide, one may add the polyamide toward the end of the melt phase reaction process, such as in the finisher, toward the end of the finishing reaction, or even after melt phase production is complete and prior to allowing the molten product to enter the die of the melt processing equipment used for making pellets.

The mixing of the components forming composition Z can occur in one step, two steps or in a plurality of steps.

Mixing can occur in one step when the components A, B, C, D, and optionally component E, are directly metered and/or let down in a form of liquid or solid concentrates or as pure components, for example in an injection and stretch blow molding machine.

The mixing can also occur in two or three steps, wherein in a first step components C, D and optionally E are predispersed into each other, and in one or more consecutive steps are added to components A and B.

It is preferred to first obtain a masterbatch comprising components C and D, and then combine this masterbatch with components A and B.

In one preferred embodiment, said first masterbatch is liquid and consists of components C, D and optionally E.

In another preferred embodiment, said first masterbatch is solid and consists of C, D, optionally E, and A.

For either two or three step mixing process, it is most preferred that the addition of or into component B occurs in the last step.

In one preferred embodiment of the invention, in a first step, component C and optionally E, are dispersed into component D to provide a liquid masterbatch. In a second step, the liquid masterbatch is metered and let down via a metering pump to a stream of polyester A and optionally component E. After being melt compounded, for example in a single or twin screw extruder, the extrudate is withdrawn in strand form, and recovered as pellets according to the usual way such as cutting. In a third step, the obtained solid masterbatch, is metered and let down by a converter/compounder into the main stream of a salt and pepper blend of polyamide pellets and polyester pellets, one or both optionally ground, or into the main stream of a polyester/polyamide concentrate, for example in an injection and stretch blow molding machine.

In another embodiment of the invention, in a first step, component C and optionally component E are dispersed into component D to provide a liquid masterbatch. In a second step, the liquid masterbatch is metered and let down via a metering pump to a stream of polyamide B and optionally component E. After being melt compounded, for example in a single or twin screw extruder, the extrudate is withdrawn in strand form, and recovered as pellets according to the usual way such as cutting. In a third step, the obtained solid masterbatch is metered and let down by a converter/compounder into the main polyester stream of e.g. an injection and stretch blow molding machine, at a rate corresponding to the final desired concentration of polyamide in the article and without the step of separately metering polyamide.

In another preferred embodiment of the invention, in a first step, components C, D and optionally component E are dispersed into component A to provide a solid masterbatch. In a second step, the obtained solid masterbatch is metered and let down by a converter/compounder into the main stream of a salt and pepper blend of polyamide pellets and polyester pellets, one or both optionally ground, or into the main stream of a polyester/polyamide concentrate, for example in an injection and stretch blow molding machine.

In another embodiment of the invention, in a first step, components C, D and optionally component E are dispersed into component B to provide a solid masterbatch. In a second step, the obtained masterbatch is metered and let down by a converter/compounder into the main polyester stream of e.g. an injection and stretch blow molding machine, at a rate corresponding to the final desired concentration of polyamide in the article and without the step of separately metering polyamide.

In another preferred embodiment of the invention, in a first step, component C and optionally component E are dispersed into component D to provide a liquid masterbatch, and, in a second step, this liquid masterbatch is metered and let down by a converter/compounder via a metering pump to the main stream of a salt and pepper blend of polyamide pellets and polyester pellets, one or both optionally ground, or into the main stream of a polyester/polyamide concentrate, for example in an injection and stretch blow molding machine.

Mixing preferably occurs continuously or batchwise, more preferably continuously; in case of a solid masterbatch MB preferably by extrusion, mixing, milling or calendering, more preferably by extrusion; in case of a liquid masterbatch MB preferably by mixing or milling; in case of a compound CO preferably by extrusion or calendaring, more preferably by extrusion.

Mixing is preferably carried out at a temperature of from 0 to 330° C.

The mixing time is preferably of from 5 sec to 36 h, preferably 5 sec to 24 h.

The mixing time in the case of continuous mixing is preferably of from 5 sec to 1 h.

The mixing time in the case of batchwise mixing is preferably of from 1 sec to 36 h.

In the case of a liquid masterbatch MB, mixing is preferably carried at a temperature of from 0 to 150° C. with a mixing time of from 0.5 minutes to 60 minutes.

In the case of a solid masterbatch MB or a compound CO, mixing is preferably carried out at a temperature of from 80 to 330° C. with a mixing time of from 5 sec to 1 h.

Preferred articles of the present invention are hollow containers which are expediently manufactured by any kind of blow moulding process known in the art. Blow molding of thermoplastic hollow containers is conventionally performed either by blow molding of an extruded thermoplastic polymeric parison (extrusion blow moulding—EBM) or by blow molding of a thermoplastic polymeric preform, the latter is usually injection molded from a thermoplastic polymer (injection and stretch blow moulding—ISBM). The hot thermoplastic polymeric parison or the heated preform is received within a mold cavity whereupon pressurized gas provides the blow molding of the container to the shape of the mold cavity.

ISBM processes are generally divided into two main types. The first is a one-step process, in which the preform is molded, conditioned, and then transferred to the stretch blow molding operation before the preform has cooled below its softening temperature. The second type of ISBM process is a two-step process in which the preform is prepared ahead of time and stored for later use. In the two-step process, the preform is reheated prior to the initiation of the stretch blow molding step. The two-step process has the advantage of faster cycle times, as the stretch blow molding step does not depend on the slower injection molding operation to be completed. However, the two-step process presents the problem of reheating the preform to the stretch blow molding temperature. This is usually done using infrared heating, which provides radiant energy to the outside of the preform. It is sometimes difficult to heat the preform uniformly using this technique and unless done carefully, a large temperature gradient can exist from the outside of the preform to the centre. Conditions usually must be selected carefully to heat the interior of the preform to a suitable molding temperature without overheating the outside. The result is that the two-step process usually has a smaller operating window than the one-step process.

To determine the oxygen scavenging capabilities of the invention, the rate of oxygen scavenging can be calculated by measuring the time elapsed until the article has depleted a certain amount of oxygen from a sealed container. For instance, a film comprising the scavenging component can be placed in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining.

In an active oxygen barrier application, it is preferable that the combination of oxygen barriers and any oxygen scavenging activity create an overall oxygen transmission rate of less than about 0.1 cubic centimeters per liter of package per day at 25° C., when the average container thickness is about 250 micrometers. It is also preferable that the oxygen scavenging capacity is such that this transmission rate is not exceeded for at least two days.

Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to maintain an internal oxygen level increase of less than 1 ppm over a period of about four weeks.

The oxygen scavenging capacity of an article comprising the invention can be measured by determining the amount of oxygen consumed until the article becomes ineffective as a scavenger.

In actual use, the oxygen scavenging capacity requirement of the article will largely depend on three parameters of each application:

the quantity of oxygen initially present in the package,
the rate of oxygen entry into the package in the absence of the scavenging property, and
the intended shelf life for the package.

For the purpose of the invention, oxygen scavenging performance of various compositions might be compared on the basis of the following empirical formula $$X \cdot t_{max} = Y$$

where, for a given oxygen scavenging composition and/or for a given article,

X is defined as the maximum oxygen content measured over an observation period of 100 days,
$t_{max}$ is defined as the time that elapses from the formation of the article and its filling until the oxygen content X reaches its maximum value and with
Y giving an indication of the oxygen scavenging efficiency and degree of induction characteristic of that certain oxygen scavenging composition.

When comparing articles comprising different oxygen scavenging compositions and having different oxygen scavenging capacity, the higher the Y value, the lower the oxygen scavenging performance of the corresponding composition and article.

The composition Z allows the use of transition metal-based polyester-polyamide blends as oxygen scavenging systems with significantly improved oxygen scavenging performance and reduced induction time.

The advantage of using an oxygen scavenging composition obtained by adding a organic compound D to a transition metal-based polyester/polyamide composition, compared to an analogous composition not comprising the organic compound D, is shown by the oxygen uptake measurements carried out for the various systems. Surprisingly, in case of the presence of an inert organic compound D, a significant reduction or complete elimination of the induction period is observed together with a more effective scavenging activity due to the lower residual oxygen concentration kept throughout the shelf-life of the product. Even more surprisingly, the addition of a transition metal salt pre-dispersed in a liquid organic compound D to a main stream of polyester and polyamide at the moment of making articles, provides compositions with excellent oxygen barrier properties and negligible induction time.

Furthermore, these unexpected behaviours allow for the use of lower amounts of the polyamide compared with the amounts needed in transition metal-based polyester/polyamide blends not comprising an organic compound D for obtaining the necessary or a comparative oxygen scavenging activity in the final polyester article.

Test Methods

The product properties are determined by the following methods, unless indicated otherwise:

Values of density are determined in accordance with ASTM D792 (g/cm$^3$).

Values of melt flow rate (MFR) are determined in accordance with ASTM D1238 (g/10 min at specified temperature and weight).

Measurement Method for Oxygen Scavenging Activity:

For a typical carbonated beverage shelf-life test, a 500 ml bottle is (i) filled with deoxygenated water up to a headspace of 10 ml, inside a nitrogen circulation glove box where the oxygen level of the water inside the bottle was stabilized at a level well below 50 ppb, (ii) carbonated with $CO_2$ to a carbonation level of 2.8 volumes (i.e. the amount of gas dissolved in every cm$^3$ of water is of 2.8 cm$^3$) and then capped. Measurement of the oxygen level in the free headspace of the bottle is then carried out using a non-invasive oxygen measurement sensor and a Fibox® transmitter. Data are collected in parallel for at least two sample bottles of the same composition, at regular time intervals and over a time frame of 100 days. For each sample bottle, the oxygen ingress at a certain time is calculated as the difference between the oxygen content measured at that time and the level of oxygen measured at time 0. The oxygen ingress is then averaged over the number of sample bottles measured for each composition and plotted against time.

Examples

% by weight mentioned in the following examples are based on the total weight of the mixture, composition or article; parts are parts by weight;

"ex" means example; "cpex" means comparative example; MB means masterbatch; unless indicated otherwise.

Substances Used

Component A1:

Polyethylene terephthalate (PET) having a density from 1.35 to 1.45 g/cm$^3$ and intrinsic viscosity from 0.74 to 0.78 dl/g (ASTM D3236-88).

Component A2:

Polybutylene terephthalate (PBT) having a density from 1.28 to 1.32 g/cm$^3$ and intrinsic viscosity from 0.90 to 1.00 dl/g (ASTM D3236-88).

Component B1:

Poly(m-xylylene adipamide) (MXD6) having a density from 1.20 to 1.30 g/cm$^3$ and MFR of 2 g/10 min (measured at 275° C./0.325 kg).

Component C1:

Cobalt stearate (9.5% Cobalt concentration)

Component C2:

Cobalt neodecanoate (20.5% Cobalt concentration)

Component D1:

Sorbitan monooleate having a density from 0.98 to 1.02 g/cm$^3$ at 20° C. and hydroxyl value of max. 220 mg KOH/g (DIN 53240).

Component D2:

White mineral oil having a density from 0.85 to 0.88 g/cm$^3$ at 15° C. and a viscosity from 66 to 74 mm$^2$/s at 40° C. (ASTM D445)

Component E1:

Isophthalic acid-modified polyethylene terephthalate having an acid value from 24 to 29 mg KOH/g (ASTM D664) and an ICI cone & plate melt viscosity at 200° C. from 7000 to 9500 mPascal·s (ASTM D4287).

Masterbatches MB1 to MB8

The components were homogenized together on a Leistritz® ZSEI8HP extruder at the temperature of 230° C. to obtain solid masterbatches MB1, MB2, MB7 and MB8. Liquid masterbatches MB3 to MB6 were obtained in a Cowles mixer by stirring the components for 15 min without intended heating. Table 1 gives the details.

TABLE 1

| Masterbatches* | Components used [parts] | | | | | | |
|---|---|---|---|---|---|---|---|
| | A2 | B1 | C1 | C2 | D1 | D2 | E1 |
| MB1(S) |  | 87 | 1.5 |  | 3 |  | 8.5 |
| MB2(S) |  | 87 | 1.5 |  |  | 3 | 8.5 |
| MB3(L) |  |  | 10 |  | 90 |  |  |
| MB4(L) |  |  |  | 5 |  | 95 |  |
| MB5(L) |  |  |  | 20 | 80 |  |  |
| MB6(L) |  |  |  | 8 | 92 |  |  |
| MB7(S) | 84 |  | 6 |  | 10 |  |  |
| MB8(S) |  | 90 | 1.5 |  |  |  | 8.5 |

*(S) are masterbatches in pellet form; (L) are masterbatches in liquid form.

Ex1 to Ex7 and Cpex1 to Cpex3

Component A1 was dried at 160° C. for 7 hrs and then the other components were homogenized and mixed in the ratios according to Table 2. The obtained Compounds CO1 to CO10 were used to manufacture 500 ml bottles via a two-step ISBM process. 23 gram preforms were firstly prepared on an injection molding machine Arburg® 420C 1000-150 and then cooled to room temperature prior to the stretch blow molding step on a Sidel® SBO-1.

As an example of operational mode, preforms were obtained via injection molding by using the Arburg® 420C 1000-150 by inserting the component A1, pre-dried for 6 hours at 160° C., into the main hopper of the machine, and by adding the other components (MB1 to MB8 and/or B1) through dosing units applied to the main stream of component A1 before entering the injection unit barrel. Barrel temperatures can be kept at temperatures between 270 and 295° C.; cycle time can vary between 14 and 16 seconds.

The weight of the preforms is chosen accordingly to the standard preforms found in the market, and can be set e.g. at 23 g per preform. The mould can be cooled by using water at e.g. 8° C. Once extracted from the mould, preforms can be collected in order to be successively blown by using a Sidel® SBO-1 blow forming unit.

This unit, equipped e.g. with a mould for 500 ml (nominal capacity) bottle, comprises a heating zone where preforms are heated at temperatures variable with the design of the preform and of the final bottle; the final temperature of the preforms is kept between 105 and 110° C.; preforms are then inserted in the bottle moulds and blown by injecting dry air or nitrogen with a profile of pressure reaching 35-40 bar at its maximum, the blowing process requiring 2 to 3 seconds time.

The average production rate was 900 bottles/hour.

Blown bottles are then collected from the blowing unit for the necessary testing.

The corresponding oxygen scavenging activity was then measured by following the method described above. A graphical representation of the results is showed in FIG. 1; corresponding numerical data are reported in Table 3.

CO10 consists of a transition metal-based polyester/polyamide composition, prepared according at the state of the art and thus, not comprising an organic compound D. CO4 has been prepared by mixing the various components according to Table 3 but without using polyamide.

TABLE 2

| | | Components used [parts] | | | | | | | | | |
|---|---|---|---|---|---|---|---|---|---|---|---|
| ex-cpex | Compounds | A1 | B1 | MB1 | MB2 | MB3 | MB4 | MB5 | MB6 | MB7 | MB8 |
| cpex1 | CO1 | 100 | | | | | | | | | |
| ext | CO2 | 95 | 5 | | | | | | | | |
| ex2 | CO3 | 95 | | | 5 | | | | | | |
| cpex2 | CO4 | 99.5 | | | | 0.5 | | | | | |
| ex3 | CO5 | 94.5 | 5 | | | 0.5 | | | | | |
| ex4 | CO6 | 94.5 | 5 | | | | 0.5 | | | | |
| ex5 | CO7 | 95 | 4.8 | | | | | 0.2 | | | |
| ex6 | CO8 | 96.7 | 3 | | | | | | 0.3 | | |
| ex7 | CO9 | 95 | 4 | | | | | | | 1 | |
| cpex3 | CO10 | 95 | | | | | | | | | 5 |

TABLE 3

| | Compounds [ppm of oxygen] | | | | | | | | | |
|---|---|---|---|---|---|---|---|---|---|---|
| Time [days] | CO1 | CO2 | CO3 | CO4 | CO5 | CO6 | CO7 | CO8 | CO9 | CO10 |
| 0 | 0.08 | 0.00 | 0.00 | 0.05 | 0.00 | 0.00 | 0.00 | 0.00 | 0.00 | 0.00 |
| 7 | 0.37 | 0.14 | 0.21 | 0.36 | 0.00 | 0.24 | −0.04 | 0.03 | 0.00 | 0.10 |
| 13 | 0.74 | 0.27 | 0.34 | 0.62 | 0.01 | 0.18 | −0.03 | 0.03 | −0.01 | 0.19 |
| 19 | 1.05 | 0.33 | 0.50 | 0.91 | 0.02 | 0.19 | −0.03 | 0.02 | −0.01 | 0.29 |
| 26 | 1.38 | 0.45 | 0.49 | 1.30 | 0.01 | 0.11 | −0.04 | 0.01 | −0.01 | 0.56 |
| 35 | 1.96 | 0.38 | 0.76 | 1.60 | 0.00 | 0.09 | −0.04 | 0.00 | −0.01 | 0.63 |
| 40 | 2.37 | 0.34 | 0.76 | 2.30 | 0.01 | 0.09 | −0.04 | −0.01 | 0.01 | 0.65 |
| 47 | | 0.24 | 0.59 | | 0.00 | 0.06 | −0.04 | 0.00 | 0.02 | 0.68 |
| 68 | | 0.14 | 0.36 | | 0.00 | 0.05 | −0.03 | 0.00 | 0.04 | 0.86 |
| 75 | | 0.12 | 0.33 | | 0.00 | 0.05 | 0.01 | 0.01 | 0.05 | 0.42 |
| 82 | | 0.08 | 0.21 | | 0.00 | 0.04 | −0.05 | 0.01 | 0.07 | 0.33 |
| 89 | | 0.07 | 0.19 | | 0.00 | 0.03 | −0.04 | 0.01 | 0.08 | 0.28 |
| 95 | | 0.05 | 0.15 | | 0.00 | 0.03 | −0.04 | 0.01 | 0.10 | 0.21 |
| 100 | | 0.13 | 0.14 | | 0.01 | 0.04 | −0.04 | 0.01 | 0.11 | 0.15 |

According to measured data and to the empirical formula defined herein, $$X \cdot t_{max} = Y$$

compositions CO1 to CO10 clearly show different oxygen scavenging performance, with the lower Y values recorded for the compositions CO2, CO5, CO6, CO7, CO8 and CO9 of the present invention. Low Y values indicate both good oxygen scavenging performance and reduced induction time. Table 4 gives the details for each composition.

TABLE 4

| Compounds | X [ppm of oxygen] | $t_{max}$ [days] | Y |
|---|---|---|---|
| CO1 (comp.) | >3 (extrapolated) | >100 | >300 |
| CO2 | 0.45 | 26 | 11.7 |
| CO3 | 0.76 | 35 | 26.6 |
| CO4 (comp.) | >3 (extrapolated) | >100 | >300 |
| CO5 | 0.02 | 19 | 0.4 |
| CO6 | 0.24 | 7 | 1.7 |
| CO7 | 0.01 | 7 | 0.1 |
| CO8 | 0.03 | 13 | 0.3 |
| CO9 | 0.01 | 7 | 0.1 |
| CO10 (comp.) | 0.86 | 68 | 58.5 |

The invention claimed is:

1. A plastic material comprising a composition Z wherein composition Z includes components A, B, C and D, and wherein
   component A is a polyester,
   component B is a polyamide,
   component C is a transition metal catalyst, and
   component D is an organic compound selected from the group consisting of paraffins, vegetable oils, esters of polyols and mixtures thereof.

2. A plastic material as claimed in claim 1, wherein component A is selected from the group consisting of polyethylene terephthalate, cyclohexane dimethanol/polyethylene terephthalate copolymer, polyethylene naphthalate, polybutylene terephthalate, and mixtures thereof.

3. A plastic material as claimed in claim 1, wherein component B is selected from the group consisting of poly(m-xylylene adipamide), poly(hexamethylene isophthalamide), poly(hexamethylene adipamide-co-isophthalamide), poly(hexamethylene adipamide-co-terephthalamide), poly(hexamethylene isophthalamide-co-terephthalamide), poly(hexamethylene adipamide), poly(caprolactam), poly(hexamethylene adipamide)-co-caprolactam, and mixtures thereof.

4. A plastic material as claimed in claim wherein component C is selected from the group consisting of cobalt oleate, cobalt propionate, cobalt stearate, cobalt neodecanoate, and mixtures thereof.

5. A plastic material as claimed in claim 1, wherein component D is liquid at ambient temperature and atmospheric pressure.

6. A plastic material as claimed in claim 1, wherein composition Z further comprises a component E, wherein component E is selected from the group consisting of
   colorants, fillers, acid scavengers, processing aids, coupling agents, lubricants, stearates, blowing agents, polyhydric alcohols, nucleating agents, antioxidants, antistatic agents, compatibilizers for polyester/polyamide blends, UV absorbers, slip agents, anti-fogging agents, anti-condensation agents, suspension stabilizers, anti-blocking agents, waxes, and mixtures thereof.

7. A plastic material as claimed in claim 1, wherein the composition Z contains
   80 to 96.9% by weight of component A;
   1 to 10% by weight of component B;
   0.0001 to 0.8% by weight of component C;
   0.01 to 2% by weight of component D;
   0 to 18.9899% by weight of component E, wherein component E is selected from the group consisting of
colorants, fillers, acid scavengers, processing aids, coupling agents, lubricants, stearates, blowing agents, polyhydric alcohols, nucleating agents, antioxidants, antistatic agents, compatibilizers for polyester/polyamide blends, UV absorbers, slip agents, anti-fogging agents, anti-condensation agents, suspension stabilizers, anti-blocking agents, waxes, and mixtures thereof;
wherein the sum of the weight is based on the total weight of the composition Z; and
wherein the sum of the weight percents of the components A, B, C, D and E is 100%.

8. A plastic material as claimed in claim 1, wherein the plastic material is in the form of a shaped plastic article.

9. A plastic material as claimed in claim 8, wherein the shaped plastic article is a container, a sheet or a film.

10. A food packaging, beverage, cosmetic, pharmaceutical or personal care article comprising a plastic material as claimed in claim 1.

11. A plastic material as claimed in claim 9, wherein the container is a bottle.

12. A method for the manufacture of a plastic material as claimed in claim 1, comprising the steps of physically mixing components A, B, C and D of composition Z to form a mixture and subjecting the mixture to a shape forming process.

13. The method as claimed in claim 12, wherein the physically mixing step is performed by an extrusion, kneading, milling or calendering process.

14. The method as claimed in claim 12, wherein the shape forming step is accomplished by blow moulding, injection moulding, injection and stretch blow moulding, extrusion blow moulding, compression moulding, compression, stretch blow moulding, cast or film extrusion.

15. The method as claimed in claim 12, wherein in a first step components C and D are predispersed into each other, and in one or more consecutive steps are added to components A and B.

16. The method as claimed in claim 12, wherein composition Z further comprises a component E, wherein component E is physically mixed with components A, B, C and B and wherein component E is selected from the group consisting of
   colorants, fillers, acid scavengers, processing aids, coupling agents, lubricants, stearates, blowing agents, polyhydric alcohols, nucleating agents, antioxidants, antistatic agents, compatibilizers for polyester/polyamide blends, UV absorbers, slip agents, anti-fogging agents, anti-condensation agents, suspension stabilizers, anti-blocking agents, waxes, and mixtures thereof.

* * * * *